Patented Jan. 1, 1952

2,580,391

UNITED STATES PATENT OFFICE 2,580,391

FIBERBOARD CONSTRUCTION

Glen E. Babcock, Vernon L. Johnsen, and Allan K. Smith, Peoria, Ill., assignors to the United States of America as represented by the Secretary of Agriculture No Drawing. Application February 23, 1951, Serial No. 212,477

4 Claims. (Cl. 154—141)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part application of Serial No. 94,533, filed May 20, 1949, now abandoned.

This invention relates to the manufacture of laminated fiberboard useful in the manufacture of industrial containers, such as cartons, boxes, barrels and the like.

This invention has among its objects the provision of a special glue for fiberboard construction which is novel and economical, and which utilizes as its major ingredients a significant proportion of agricultural material. Another object of the invention is the provision of a process whereby laminated fiberboard may be fabricated simply and at a greatly reduced cost.

Fiberboard laminating glues heretofore used in industry comprise for the most part starches or degraded starches fortified with synthetic resins, such as the urea type or vinyl type. Urea resins result in a short pot life and a brittle film, although they have fair water resistance. Vinyl resins give satisfactory general results but the cost is excessive.

We have discovered a glue formulation and a process of employing it which results in a high-quality laminated fiberboard product with surprisingly good water resistance and excellent strength characteristics. The glue possesses characteristics which render it particularly useful in the paper laminating field. This formulation consists of:

About from 10 to 18 parts of soy flour,
About from 10 to 2 parts of soy protein,
About from 2½ to 10 parts of a 20 percent solution of one of the group consisting of an ammonium resin and the corresponding alkali metal salts thereof,
About from 2½ to 10 parts saponified rosin,
About from 10 to 15 parts of an 8 percent sodium hydroxide solution, and sufficient water to make a spreadable glue containing about from 18 to 26 percent solids.

The soy flour, which includes soy meal, is that available as an article of commerce, having an oil content of about 1 percent or less. The soy protein employed is isolated soybean protein containing 90 percent or more protein. The sum of the parts of soy flour and soy protein in this formula should equal approximately 20 parts. For example, when the proportion of one is increased within the range specified, the proportion of the other is correspondingly decreased. Since the soy flour is the cheaper adhesive ingredient, it is usually desirable to employ it in maximum proportion.

The ammonium resin is readily available as an article of commerce. It is a complex ammonium salt of a copolymer of a four carbon, alpha, beta unsaturated dicarboxylic acid with styrene, such as that obtained by the emulsion copolymerization of a soluble salt of fumaric acid and styrene. It has a molecular weight of about from 2000 to 7000 and contains a substantial proportion of acidic groups. It is water-soluble and the alkali metal salts thereof, such as the sodium salt, are also water-soluble. It functions as a tackifier, enabling the glue compound to hold the paper board together until the protein components set the bond in the final waterproof form. It results in a temporary bond sufficient to tear the paper, when the laminate is forcibly separated, in a few seconds after pressure has been applied by means of pressure rolls. Thus the glue may be used with production machinery involving speeds up to 400 lineal feet per minute and higher.

The saponified rosin functions to stabilize the viscosity of the glue and supplements the tackifying action of the ammonium resin. This rosin ingredient could be omitted if the proportion of the ammonium resin were slightly increased, nevertheless we prefer to employ it in the stated proportions, since this results in a more economical glue formulation, the ammonium resin being relatively more expensive than the saponified rosin.

The amount of sodium hydroxide used corresponds to that necessary to adjust the pH within the range of 10.5 to 11.0 of the formulated glue.

The above specialty glue has been found to give entirely satisfactory results in the paper laminating field and compares favorably with the expensive starch-vinyl resin specialty glues of the prior art. Nevertheless, we have discovered that this glue has certain limitations when employed as such in the usual commercial fabrication steps in the manufacture of laminated fiberboard. It gives excellent results up to 2 or 3 hours after the glue composition has been made up. After this time, the viscosity of the glue increases rapidly until it soon reaches a value 3 to 10 times the normal operating viscosity, and finally becomes too thick to spread. The tackiness of the glue is also reduced to an unsatisfactory value; an excessive amount of scrap is produced because the glued paper fails to hold together during fabrication processes.

For many purposes the above glue is distinctly advantageous, and for fabrication processes requiring short times it is possible to produce with the glue, laminated products of excellent quality.

We have further discovered that the pot life of the above glue can be increased up to 96 hours and longer, and the original tackiness preserved by the simple expedient of adding sufficient sodium hydroxide to the glue to maintain the pH within the range of 10.5 to 11.0. We have learned that the original glue as formulated above begins to evolve ammonia after an hour or so, the pH dropping to about 10.4 or less. We believe it is this change in pH which causes the glue to become thick and to lose its tackiness. In any event, the addition of sodium hydroxide in amounts sufficient to maintain the pH within the desired range results in indefinitely prolonged pot life and maintenance of the necessary tackiness in the glue.

The addition of sodium hydroxide is accomplished conveniently during the actual fabricating process by simply adding the required amount of sodium hydroxide as soon as the pH falls below the desired range.

We have further discovered that the above process may be modified advantageously and the periodic addition of sodium hydroxide avoided entirely by simply converting the ammonium resin to the corresponding sodium resin. The converted resin is employed in the original formulation. By doing so, the difficulties of shortened pot life and decreasing tackiness are entirely eliminated. The conversion of the resin may be accomplished in known manner, such as for example, by treating the stock solution with sodium hydroxide and removing the evolved ammonia by agitating, aerating, and/or heating the resin solution.

The following specific examples illustrate the invention. The parts given are by weight.

*Example 1*

The following glue formulation was made up:

| | Parts |
|---|---|
| Soy flour | 15 |
| Soy protein | 5 |
| Ammonium resin (20 percent solution) | 5 |
| Saponified rosin | 7 |
| Sodium hydroxide (8 per cent solution) | 12 |
| Water | 90 |

The above glue had a solids content of 20 percent and if kept in closed containers was stable for long periods of time. At room temperature the glue is transformed into a soft gel. At 60° C. and above, it is easily spreadable, the soft gel disappearing upon heating. In accordance with present paper laminating practice, glue formulae are employed at about 60° C., depending on the type of board being glued. High absorbent stock is run at lower temperatures to conserve glue. The glues employed must be quite thin at these temperatures, becoming much thicker on cooling to room temperature. The increased viscosity on rapid cooling is a desirable, if not necessary factor in developing a strong tack. The glue, formulated as specified above, was used in a commercial scale fabrication for producing 4-ply laminated container board. It gave excellent results for the first two hours of operation, but after this time the viscosity of the glue began to increase, and the tackiness decreased until the amount of scrap produced began to be excessive.

*Example 2*

A 1000 gallon batch of glue was formulated as specified in Example 1 and was employed, as in Example 1, in the manufacture of multi-ply laminated container board. In this example, the pH of the glue was maintained at approximately 10.7 to 10.8 by the periodic addition of sodium hydroxide. The products were of excellent quality, throughout the trial run, which lasted for a half day. Half of the glue was held overnight, and the batch used up on the following day. The results were uniformly excellent. The viscosity of the glue remained at its original value of approximately 30 poises when measured at 60° C. and the tackiness characteristic of the original glue remained substantially unchanged.

*Example 3*

A glue was formulated as specified in Example 1 with the exception that the sodium salt of the ammonium resin was substituted. This sodium salt was readily prepared as follows. Sodium hydroxide and the ammonium resin were mixed at room temperature in the ratio of 1 part sodium hydroxide solids to 6 parts ammonium resin solids. The resulting solution was allowed to dry, and as it dried, it evolved gaseous ammonia. Alternatively, the aqueous solution, instead of being dried may be heated and aerated to remove the evolved ammonia.

This glue was employed to fabricate laminated fiberboard on a laboratory scale. It had viscosity and tackiness characteristics substantially identical with the glues of Examples 1 and 2, and was stable for indefinite periods of time involving several days. The laminated products were pliable, and had excellent water resistance and strength characteristics.

We claim:

1. A fiberboard laminating glue consisting of about from 10 to 18 parts of soy flour, about from 10 to 2 parts of soy protein, the sum of the parts of said soy flour and soy protein equaling approximately 20 parts, about from 2½ to 10 parts of a 20 percent solution of one of the group consisting of the ammonium salt of a copolymer of a four carbon, alpha, beta unsaturated dicarboxylic acid with styrene and the corresponding alkali metal salt thereof, about from 2½ to 10 parts saponified rosin, about from 10 to 15 parts of an 8 percent sodium hydroxide solution, and sufficient water to make a spreadable glue containing about from 18 to 26 percent solids, the amount of the said sodium hydroxide being sufficient to give a pH within the range of 10.5 to 11.0 to the glue.

2. The composition of claim 1, wherein the alkali metal salt is the sodium salt.

3. In a process for the manufacture of laminated fiberboard comprising coating individual sheets of fiberboard with glue and subjecting the laminated board to conditions of heat and pressure, the improvement comprising employing a glue of the composition of claim 1 and maintaining the pH of the glue within the range of 10.5 to 11.0 by periodic addition of sodium hydroxide.

4. A laminated fiberboard comprising a plurality of fiberboard sheets bonded together by the glue of claim 1.

GLEN E. BABCOCK.
VERNON L. JOHNSEN.
ALLAN K. SMITH.

REFERENCES CITED

The following references are of record in the file of this patent:

UNITED STATES PATENTS

| Number | Name | Date |
|---|---|---|
| 1,877,202 | Satow | Sept. 13, 1932 |
| 2,315,402 | D'Alelio | Mar. 30, 1943 |
| 2,369,427 | Bennett | Feb. 13, 1945 |
| 2,385,240 | Ware | Sept. 18, 1945 |